United States Patent
Ames

(10) Patent No.: US 7,466,631 B1
(45) Date of Patent: Dec. 16, 2008

(54) ENHANCED SENSITIVITY PRESSURE TOLERANT FIBER OPTIC HYDROPHONE

(75) Inventor: Gregory H. Ames, South Kingstown, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 240 days.

(21) Appl. No.: 11/602,432

(22) Filed: Oct. 19, 2006

(51) Int. Cl.
*G01H 9/00* (2006.01)

(52) U.S. Cl. .................................. 367/149; 367/172

(58) Field of Classification Search ............. 367/149, 367/172; 385/12, 13
See application file for complete search history.

(56) References Cited

U.S. PATENT DOCUMENTS

| | | | | |
|---|---|---|---|---|
| 4,570,248 A * | 2/1986 | Assard | ................ | 367/149 |
| 4,893,930 A * | 1/1990 | Garrett et al. | ................ | 367/149 |
| 5,155,548 A * | 10/1992 | Danver et al. | ................ | 367/149 |
| 5,253,222 A * | 10/1993 | Danver et al. | ................ | 367/149 |
| 5,285,424 A * | 2/1994 | Meyer | ................ | 367/149 |
| 5,317,544 A * | 5/1994 | Maas et al. | ................ | 367/149 |
| 5,317,929 A * | 6/1994 | Brown et al. | ............. | 73/514.01 |
| 5,361,240 A * | 11/1994 | Pearce | ................ | 367/172 |
| 5,363,342 A * | 11/1994 | Layton et al. | ................ | 367/149 |
| 5,394,377 A * | 2/1995 | vonBieren | ................ | 367/149 |
| 5,504,720 A * | 4/1996 | Meyer et al. | ................ | 367/149 |
| 5,625,724 A * | 4/1997 | Frederick et al. | ................ | 367/149 |
| 5,737,278 A * | 4/1998 | Frederick et al. | ................ | 367/149 |
| 6,108,274 A * | 8/2000 | Pearce | ................ | 367/157 |
| 6,122,225 A * | 9/2000 | Cheng et al. | ................ | 367/149 |
| 6,549,488 B2 * | 4/2003 | Maas et al. | ................ | 367/149 |
| 6,882,595 B2 * | 4/2005 | Woo | ................ | 367/149 |
| 7,082,079 B2 * | 7/2006 | Woo | ................ | 367/149 |
| 2003/0035344 A1 * | 2/2003 | Maas et al. | ................ | 367/149 |
| 2004/0184352 A1 * | 9/2004 | Woo | ................ | 367/149 |
| 2004/0202401 A1 * | 10/2004 | Berg et al. | ................ | 385/12 |
| 2005/0195687 A1 * | 9/2005 | Woo | ................ | 367/149 |

* cited by examiner

*Primary Examiner*—Daniel Pihulic
(74) *Attorney, Agent, or Firm*—James M. Kasischke; Michael P. Stanley; Jean-Paul A. Nasser

(57) ABSTRACT

An interferometric hydrophone operable for use in surrounding fluid, includes an outer mandrel having an interior open to the surrounding fluid. A sensing optical fiber is wound on the exterior of the outer mandrel. An inner mandrel is positioned in the interior of the outer mandrel. A chamber defined between the inner mandrel and outer mandrel is in communication with the surrounding fluid. The inner mandrel has a sealed gas filled interior. Compression and expansion of the inner mandrel results in compression and expansion of the outer mandrel.

9 Claims, 3 Drawing Sheets

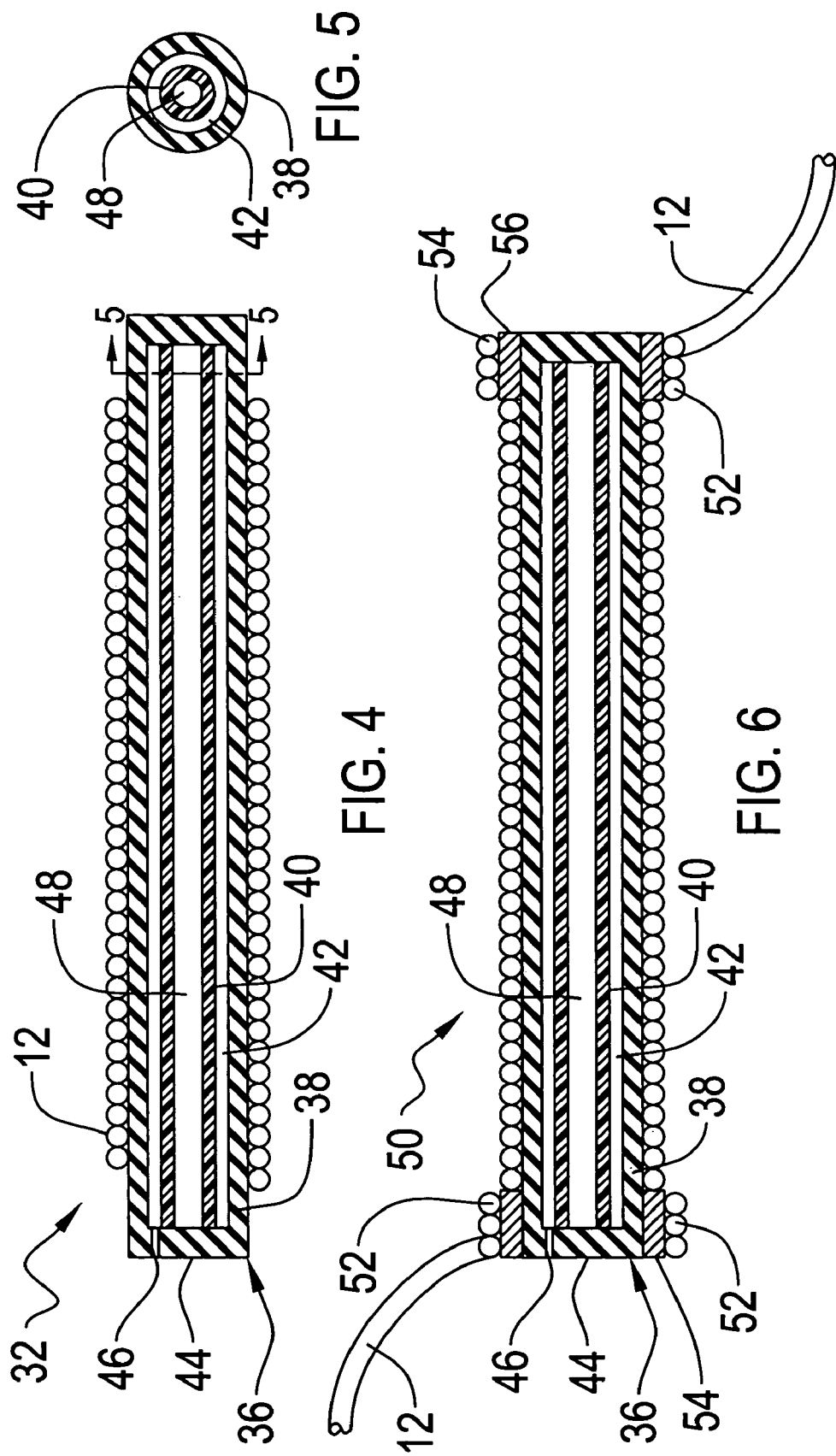

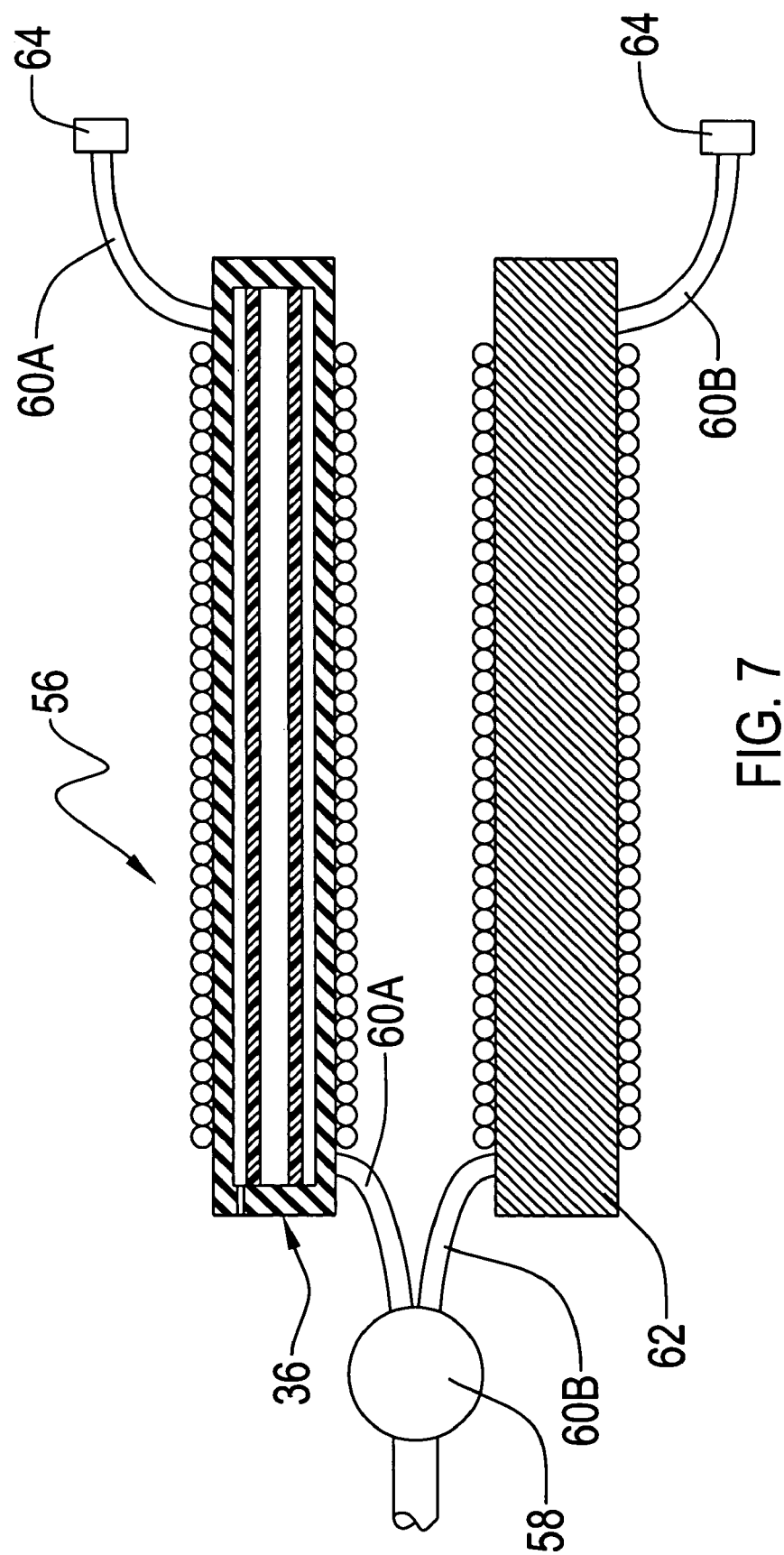

ENHANCED SENSITIVITY PRESSURE TOLERANT FIBER OPTIC HYDROPHONE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

The present invention relates generally to hydrophones and, more particularly, to an enhanced sensitivity fiber optic interferometric hydrophone in which the path mismatch of the interferometer does not vary with changes in static pressure due to depth of operation.

2. Description of the Prior Art

Fiber optic interferometric hydrophones are well known in the art. They generally take one of two forms. In the planar hydrophone form, the hydrophones consist in part of fiber wound spirally into a disc form. In the linear hydrophone form of interest to this invention, the hydrophone consists in part of fiber wound around a cylindrical pressure-compliant sensor mandrel. Though many different materials may be used for the mandrel, the most sensitive designs use a hollow, sealed, air-filled mandrel. This fiber wrapped sensor mandrel is only part of the hydrophone. The complete hydrophone may take several forms.

One such form is the Michelson interferometer type hydrophone 10 shown in FIG. 1. An interrogating light signal travels through a fiber optic line 12 to the hydrophone 10. The interrogating light signal is split by coupler 14 to two fiber optic branches 16A and 16B. One branch 16A is wrapped around mandrel 18. A reflector 20 at the end of the each signal fiber branch 16A and 16B reflects light back though the sensor fiber to coupler 14. The other branch 16B of the fiber optic line 12 has the same length as sensing branch 16A and is known as the reference branch. Reference branch 16B is wrapped in such a manner as to be insensitive to pressure. Reference branch 16B is also terminated with a reflector 20 to reflect the light back to coupler 14. Sometimes the two branches 16A and 16B are located concentric to each other, while in other designs they may merely be located near each other.

A second form is a Mach-Zehnder interferometer type hydrophone 22 shown in FIG. 2. Again, in this type of hydrophone, a fiber optic line 12 is split by a coupler 14 into a sensing branch 16A and a reference branch 16B. The sensing branch 16A is wound on a compliant mandrel 18 which is subjected to pressure variations. The reference branch 16B is wrapped in a manner so as to be insensitive to pressure. This is similar to the Michelson type interferometer 10, except that the two branches 16A and 16B are recombined by a second coupler 24 into a single fiber optic line 26.

A third form is the pseudo-Fabry-Perot interferometer type hydrophone 28 shown in FIG. 3. In this form, fiber optic line 12 is wrapped on sensor mandrel 18 as previously described. Two partial reflectors 30 are formed in fiber optic line 12 on either side of mandrel 18. Partial reflectors 30 can be broadband partial mirrors or narrowband Bragg gratings. The Reference path is provided at a remote location in the transmitter/receiver equipment of the interferometer. There, a device known as a compensator splits pulsed light into two paths, delaying one set of pulses in relation to the other.

A primary disadvantage of previous types of hydrophones is that very expensive, low frequency noise lasers must be used to interrogate them. Less expensive lasers such as diode distributed feedback (DFB) lasers have higher levels of frequency noise, which limit the system noise performance. The system laser phase noise is proportional to the laser frequency noise and to the path mismatch length between the two branches of the interferometer. The Michelson type hydrophone generally requires a path mismatch of a few meters between the two paths of the sensor. The pseudo-Fabry-Perot type hydrophone can be precisely path matched to within a few millimeters. However, in all previous designs, static pressure changes occurring as the hydrophone changes water depth result in changes in the sensor path length and mismatch. Such mismatches can be tens of centimeters, leading to unacceptable increases in laser phase noise.

A second disadvantage of previous hydrophone designs is that they tend to be sensitive to a broad range of acoustic frequencies. In most applications, a restricted range of frequencies is of interest and the sensitivity to lower frequencies may cause problems, limiting performance in the band of interest.

The following U.S. patents describe various prior art systems that may be related to the above and/or other telemetry systems:

U.S. Pat. No. 4,525,818, issued Jun. 25, 1985, to Cielo et al, discloses an optical fiber hydrophone system in which a single optical fiber is used for all of the acoustical sensors in the system. A signal source and detector provides an optical signal in selected form, such as continuous or pulsed, and detects and extracts an identifiable output signal. Each sensor is in the form of a sensing portion of the single optical fiber. Each sensing portion includes two optical reflectors separated one from another by a predetermined length of said optical fiber. Variations in acoustical pressure incident on the sensing portion cause a change in the predetermined length. This causes reflected portions of the optical signal to interfere with one another. Such interference is detectable for extraction of the identifiable output signal. In one form, each sensing portion has two terminal branches of a mechanically deformable material, deformable in response to the fluctuations in acoustical pressure. Preferably, the optical fiber has two portions, a sensing portion thereof underwater and having a first optical cavity, and another portion thereof on board a vessel and having a second optical cavity, typically tunable with respect to the optical length thereof to maximize the interference in the detected optical signal.

U.S. Pat. No. 5,253,222, issued Oct. 12, 1993, to Danver et al, discloses an omnidirectional fiber optic hydrophone that includes a concentrically-arranged pair of ring-shaped mandrels mounted between planar upper and base members. Each of the rings is formed of inner and outer annular portions separated by an annular void. Optical fibers wound about the outer circumference of the outer annular portion of the outer ring and about the outer circumference of the inner annular portion of the inner ring communicate with a source of optical energy and with a photodetector to provide signals for measuring acoustic wave-induced deflections of the rings. A plurality of mandrels may be employed in a single hydrophone, which may be potted with elastomeric material or free flooded.

U.S. Pat. No. 5,317,544, issued May 31, 1994, to Maas et al, discloses a hydrophone that includes a plurality of hydrophone components separated by finite spacings and interconnected to provide a single output signal. Each hydrophone component is based upon a single-mandrel design in which a cylindrical body is apportioned into sensing and reference sections. The sensing sections comprise coaxial arrangements of pliant inner and outer cylinders separated by an annular airspace while the adjacent reference sections comprise solid-walled cylinders. Finite separation distances between the hydrophone components result in reduced flow noise occasioned by increased sensing area while detection sensitivity is maintained.

U.S. Pat. No. 5,394,377, issued Feb. 28, 1995, to von-Bieren, discloses a hydrophone that is formed of first and second optical fibers coupled together to form a fiber optic interferometric sensor for sensing an acoustic signal. The optical fibers are wrapped around a pair of concentric, thin-walled hollow cylinders. The fiber wrapped around the inner cylinder is the reference leg of the interferometer and the fiber wrapped around the outer cylinder is the signal leg. The reference leg is exposed to the hydrostatic pressure but isolated from the acoustic signal. The sensing leg is exposed to both the hydrostatic pressure and the acoustic wave signal. The signal output from the interferometer is indicative of changes in the acoustic wave signal.

U.S. Pat. No. 5,504,720, issued Apr. 2, 1996, to Meyer et al, discloses a plurality of air-backed elongate mandrels that are arranged in an planar array such that their longitudinal axes are parallel. A length of a first optical fiber is wound around portions of each mandrel in a first group of the mandrels for exposure to the parameter. The first optical fiber is arranged such that exposing it to the parameter to be sensed causes the length of the first optical fiber to increase and decrease in direct proportion as the parameter increases and decreases. A length of the second optical fiber is wound around a second group of the mandrels for exposure to the parameter. The second optical fiber preferably is arranged such that exposing it to the parameter to be sensed causes the length of the second optical fiber to increase and decrease in inverse proportion as the parameter increases and decreases.

U.S. Pat. No. 5,668,779, issued Sep. 16, 1997, to Dandridge et al, discloses a hydrophone group for shallow towed applications in less than 50 feet of water. The hydrophone group has a series of hydrophones connected by relatively insensitive fiber optic interconnects. The individual hydrophones are sufficiently sensitive such that the interconnecting optical fiber does not introduce excessive noise. Each hydrophone is basically a sensing fiber wrapped around an air-backed mandrel. Each air-backed mandrel is formed of an extended solid frame substantially non-compliant along a longitudinal axis. The extended solid frame is provided with a channel around the periphery thereof. The channel extends substantially the entire length of the extended solid frame. A flexible outer covering surrounds the extended solid frame. The flexible outer covering is highly compliant in a radial direction extending from the longitudinal axis. The air-backed mandrel has a high frequency mechanical resonance. Each hydrophone is connected in a chain by a plurality of interconnects having a substantially lower sensitivity than each hydrophone.

U.S. Pat. No. 6,122,225, issued Sep. 19, 2000, to Cheng et al, discloses device for measuring pressure waves in a liquid medium that has a compensation chamber beneath the sensor. Cylindrical embodiments have an inner mandrel and an outer mandrel with a fiber sensor wound on an inner surface of the outer mandrel, positioning it between the two mandrels. A compensating chamber is defined between the inner mandrel and outer mandrel. The interior of the inner mandrel is filled with gas. Equalization of pressure of the inner mandrel is achieved indirectly using a membrane in fluid communication with the inner mandrel.

The above cited prior art does not disclose a hydrophone design which allows for path matching to be maintained over changes in static pressure and, additionally, provide enhanced sensitivity to allow high pressure usage. The solutions to the above described and/or related problems have been long sought without success. Consequently, those skilled in the art will appreciate the present invention that addresses the above and other problems.

SUMMARY OF THE INVENTION

It is a general purpose of the present invention to provide an improved hydrophone.

An object of the present invention is to permit use of inexpensive higher frequency noise lasers for interrogating the hydrophone interferometer.

Another object of the present invention is to enhance hydrophone sensitivity.

Accordingly, the current invention provides an interferometric hydrophone operable for use in surrounding fluid, that includes an outer mandrel having an interior open to the surrounding fluid. A sensing optical fiber is wound on the exterior of the outer mandrel. An inner mandrel is positioned in the interior of the outer mandrel. A chamber defined space between the inner mandrel and outer mandrel is in communication with the surrounding fluid. The inner mandrel has a sealed gas filled interior. Compression and expansion of the inner mandrel results in compression and expansion of the outer mandrel.

These and other objects, features, and advantages of the present invention will become apparent from the drawings, the descriptions given herein, and the appended claims. However, it will be understood that above listed objects and advantages of the invention are intended only as an aid in understanding certain aspects of the invention, are not intended to limit the invention in any way, and do not form a comprehensive or exclusive list of objects, features, and advantages.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein:

FIG. 4 is an elevational view, in section, showing an encased hydrophone design with multiple inner mandrels in accord with one embodiment of the present invention;

FIG. 5 is an elevational view, in section, along lines 5-5 of FIG. 4 showing a hydrophone design in accord with one embodiment of the present invention;

FIG. 6 is an elevational view, in section, showing an encased hydrophone design with multiple inner mandrels in accord with another embodiment of the present invention; and FIG. 7 is an elevational view, in section, showing an encased hydrophone design with multiple inner mandrels in accord with yet another embodiment of the present invention.

DESCRIPTION OF THE PREFERRED EMBODIMENT

Figure 1:
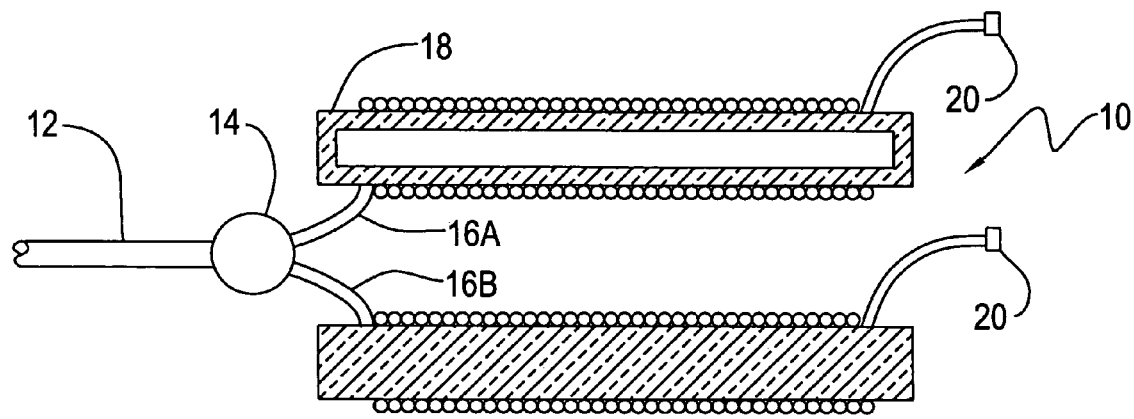
FIG. 1 is an elevational view, in section, showing one form of a prior art Michelson type interferometer hydrophone.
Figure 2:
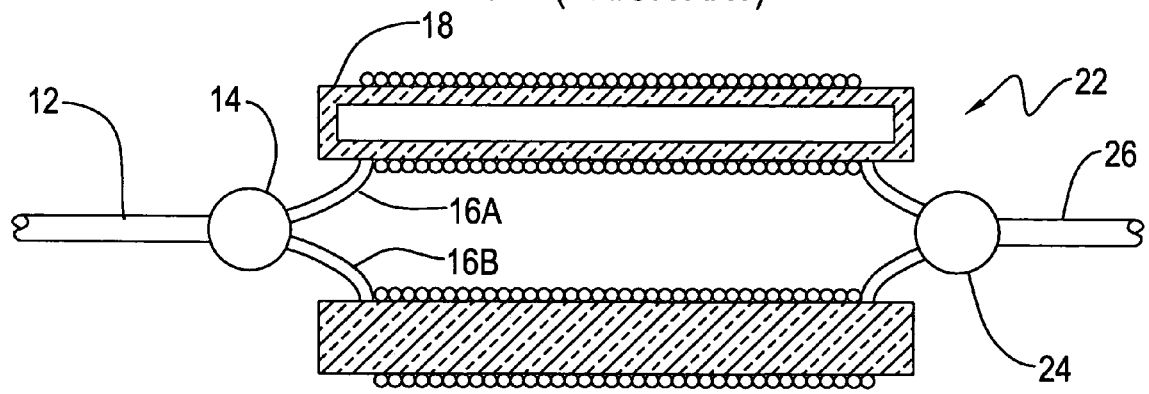
FIG. 2 is an elevational view, in section, showing one form of a prior art Mach-Zehnder type interferometer hydrophone.
Figure 3:
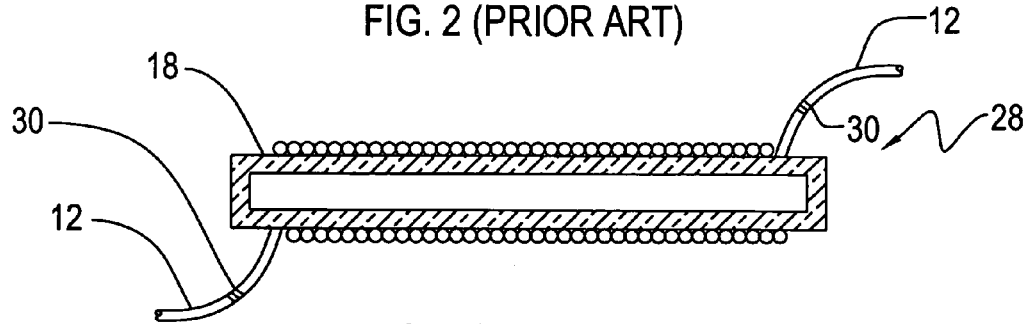
FIG. 3 is an elevational view, in section, showing one form of a prior art pseudo-Fabry-Perot type interferometer hydrophone.

The presently described hydrophone utilizes a structure that provides a high pass filter function, which makes the hydrophone insensitive to low frequency signals and static pressure changes. As a result, a change in the operational depth of the hydrophone does not result in a path mismatch of the interferometer. The hydrophone may be manufactured with and maintain a path mismatch of a few millimeters. This small path mismatch minimizes the system laser phase noise, allowing the use of lasers with higher frequency noise than those typically used within the present art, while still maintaining required noise performance. Less expensive diode lasers may be used, reducing laser cost by an order of magnitude or more. This in turn permits systems in which the transmitter portion is disposable or which may be used in situations involving a high risk of loss. For instance, systems incorporating the present invention may be deployed bottom-mounted hydrophone arrays for Navy surveillance, or for seismic oil and gas field exploration or oil field monitoring. The low frequency filtering provided by the present invention is also advantageous in some systems susceptible to interfering low frequency signals.

FIGS. 4 and 5 give a basic embodiment of a hydrophone 32 of the current invention. Hydrophone 32 comprises a fiber optic line 34 wound on a mandrel 36. Mandrel 36 has an outer mandrel 38 and an inner mandrel 40 located concentrically inside outer mandrel 38. A cavity 42 is defined between the outer surface of inner mandrel 40 and the inner surface of outer mandrel 38. End walls 44 seal ends of mandrel 36. At least one end wall 44 has an aperture 46 formed therein that allows communication of environmental fluid with cavity 42. The interior region 48 of inner mandrel 40 is preferably filled with a gas, but it can also be low pressure region. Inner mandrel 40 is pressure compliant, and it changes its volume with applied pressure. Outer mandrel 38 is designed with material and wall thickness that make it more compliant with pressure than inner mandrel 40.

In operation, hydrophone 32 acts differently according to the frequency of the acoustic pressure signal. When slow pressure changes or low frequency pressure signals are applied, environmental fluid passes through aperture 46 to equalize pressure on either side of outer mandrel 38. This has no affect on fiber optic line 12. Large pressure changes can be accommodated without changing the length of fiber optic line 12. When a high frequency pressure signal acts on the hydrophone 32, aperture 46 restricts the rapid flow of fluid, preventing equalization of cavity 42. The pressure difference between cavity 42 and external fluid causes a compression of inner mandrel 40 and a corresponding compression of outer mandrel 38 through walls 44. Because of the chosen compliances and dimensions, outer mandrel 38 preferably compresses by the same volume as inner mandrel 40. This also causes a length change in fiber optic line 12 that can be detected as a phase signal in the light carried by fiber optic line 12.

FIG. 6 shows the use of this sensor mandrel 36 in a hydrophone 50 of the pseudo-Fabry-Perot type. Bragg gratings 52 are written in the core of a portion of the fiber optic line 12 at either end of mandrel 36. The portion of the fiber optic line 12 having Bragg gratings is wound onto thermal compensating, cylindrical mounts 54.

FIG. 7 shows the use of this sensor mandrel 36 in a complete Michelson hydrophone 56. Fiber optic line 12 is joined to a coupler 58 providing two branches 60A and 60B. Sensing branch 60A is wound on mandrel 36. Reference branch 60B is wound on a structure 62 not subject to the pressure variations being sensed. Reflectors 64 are placed at the end of branches 60A and 60B. It should be understood that numerous other physical arrangements of the basic components of this invention can be used.

This sensor mandrel is advantageous over the prior art because it provides a high pass filter function which makes the hydrophone incorporating the mandrel insensitive to low frequency signals and static pressure changes. As a result, a change in the operational depth of the hydrophone does not result in a path mismatch of the interferometer caused by path length changes. The hydrophone can be manufactured with and maintain a path mismatch of a few millimeters. This small path mismatch minimizes the system laser phase noise, allowing the use of lasers with higher frequency noise than those typically used in the existing hydrophone arrays. Lasers such as diode lasers can be used, reducing laser cost by an order of magnitude or more. This permits systems having disposable transmitters in such applications as bottom-mounted hydrophone arrays.

Many additional changes in the details, components, steps, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. An interferometric hydrophone operable for use in surrounding fluid, comprising:
    an outer mandrel defining an outer mandrel exterior and an outer mandrel interior which is open to said surrounding fluid, said outer mandrel having a first end and a second end;
    sensing optical fiber having a first end, a wound portion wound upon said outer mandrel exterior, and a second end;
    an inner mandrel positioned within said outer mandrel interior, said inner mandrel defining an inner mandrel interior, said outer mandrel and said inner mandrel defining a chamber therebetween, said inner mandrel being joined to said outer mandrel so that fluctuation in the volume of said inner mandrel causes a corresponding fluctuation in the volume of said outer mandrel; and
    a gas filling said inner mandrel interior.

2. The interferometric hydrophone of claim 1 further comprising
    a first end wall joined between said outer mandrel and said inner mandrel at the first end of said outer mandrel and said inner mandrel; and
    a second end wall joined between said outer mandrel and said inner mandrel at the second end of said outer mandrel and said inner mandrel.

3. The interferometric hydrophone of claim 2 wherein said opening between said outer mandrel interior and said surrounding fluid is provided by at least one orifice formed in one of said first wall and said second wall.

4. The interferometric hydrophone of claim 3 wherein said at least one orifice is sized large enough to permit fluid flow to equalize pressure across said outer mandrel due to static pressure but restrict fluid flow caused by at least some pressure wave frequencies in said surrounding fluid.

5. The interferometric hydrophone of claim 2 wherein said outer mandrel compresses by the same volume as said inner mandrel when subjected to a change in pressure in said surrounding fluid.

6. The interferometric hydrophone of claim 1 wherein:
   said sensing optical fiber wound upon said outer mandrel has a first portion wound proximate the first end of said outer mandrel, an intermediate portion wound at a middle of said outer mandrel, and a second portion wound proximate the second end of said outer mandrel;
   said sensing optical fiber has a first partial reflector formed in said sensing optical fiber at said first portion; and
   said sensing optical fiber has a second partial reflector formed in said sensing optical fiber at said second portion.

7. The interferometric hydrophone of claim 6 wherein said first and second partial reflectors are fiber Bragg gratings.

8. The interferometric hydrophone of claim 7 further comprising at least two temperature compensating cylindrical mounts positioned on said outer mandrel proximate said first end and said second end of said outer mandrel, and capable of supporting said sensing optical fiber first portion and said sensing optical fiber second portion.

9. The interferometric hydrophone of claim 1 further comprising:
   an optical fiber for communicating with the interferometric hydrophone;
   an optical fiber coupler having a combined port, a first divided port, and a second divided port, said optical fiber being joined to said combined port, and said sensing optical fiber first end being joined to said first divided port;
   a reference optical fiber having a first end joined to said second divided port and a second end, said reference optical fiber providing a reference length of optical fiber and being positioned adjacent said sensing optical fiber;
   a first reflector positioned on the second end of said sensing optical fiber; and
   a second reflector positioned on the second end of said reference optical fiber.

* * * * *